(12) United States Patent
Shiraishi et al.

(10) Patent No.: US 7,156,340 B2
(45) Date of Patent: Jan. 2, 2007

(54) STRIP CONTINUOUS SUPPLY APPARATUS AND METHOD

(75) Inventors: Yoshihide Shiraishi, Noda (JP); Kazushi Noguchi, Noda (JP)

(73) Assignee: Komori Corporation, Tokyo (JP)

( * ) Notice: Subject to any disclaimer, the term of this patent is extended or adjusted under 35 U.S.C. 154(b) by 45 days.

(21) Appl. No.: 10/947,179

(22) Filed: Sep. 23, 2004

(65) Prior Publication Data
US 2005/0077417 A1    Apr. 14, 2005

(30) Foreign Application Priority Data
Sep. 26, 2003  (JP) .............................. 2003-335235

(51) Int. Cl.
*B65H 19/18*   (2006.01)
*B65H 21/00*   (2006.01)

(52) U.S. Cl. ............................... 242/555.5; 242/554.3; 242/563; 242/559.2

(58) Field of Classification Search ............ 242/554.3, 242/555.1, 555.3, 555.5, 563, 554, 554.6, 242/559.2, 555.7
See application file for complete search history.

(56) References Cited

U.S. PATENT DOCUMENTS

| 3,298,623 A | 1/1967 | Lighton et al. |
| 3,825,201 A | 7/1974 | Osta |
| 6,096,150 A * | 8/2000 | Ohno ........................ 156/157 |
| 6,113,753 A * | 9/2000 | Washburn .............. 204/192.15 |
| 6,264,417 B1 * | 7/2001 | Salsburg .................... 414/610 |
| 2002/0074087 A1 * | 6/2002 | Hashimoto ................. 156/362 |

FOREIGN PATENT DOCUMENTS

| EP | 1215149 A1 | 6/2002 |
| JP | 2568743 Y2 | 1/1998 |
| JP | 2002-308485 A | 10/2002 |

* cited by examiner

Primary Examiner—William A. Rivera
Assistant Examiner—William E. Dondero
(74) Attorney, Agent, or Firm—Birch, Stewart, Kolasch & Birch, LLP (57) ABSTRACT

A feeding apparatus comprises a rotatably supported turret arm for supporting a new web roll and an old web roll, and a turret arm turning motor for rotating the turret arm, and splices a web of the new web roll to a web of the old web roll, thereby continuously supplying a web. The feeding apparatus further comprises a web roll diameter measuring distance meter, provided at a position opposed to the circumferential surface of the new web roll when the new web roll stops at a diameter measuring position, for measuring the distance to the new web roll; and a control device for determining the diameter of the new web roll in accordance with an output from the distance meter, and driving the turret arm turning motor in accordance with the determined diameter of the new web roll to move the new web roll to a splicing standby position.

11 Claims, 6 Drawing Sheets

STRIP CONTINUOUS SUPPLY APPARATUS AND METHOD

CROSS REFERENCE TO RELATED APPLICATION

The entire disclosure of Japanese Patent Application No. 2003-335235 filed on Sep. 26, 2003, including specification, claims, drawings and summary, is incorporated herein by reference in its entirety.

BACKGROUND OF THE INVENTION

1. Field of the Invention

This invention relates to a strip continuous supply apparatus and method preferred for application to a feeding apparatus or the like of a rotary press.

2. Description of the Related Art

In a machine, for example, a rotary press, that uses a roll (a web in wound form) while unwinding it, an operation is continued by automatically splicing a roll being unwound (i.e., an old web roll) to a new roll (a new web roll) by use of an automatic splicing apparatus, without stopping the operation of the machine, when the old web roll approaches the end of its unwinding (see Japanese Patent Application Laid-Open No. 2002-308485).

Conventionally, a diameter measuring device for a new web roll in an automatic splicing apparatus of an offset rotary press has been provided with a rotary, encoder for measuring the angle of rotation of a support shaft of a turret arm, the rotary encoder being provided on the support shaft of the turret arm. The diameter measuring device also has a transmission type photosensor provided in a direction intersecting a transport path of the new web roll transported by the turret arm. Because of this arrangement, the angle of rotation of the turret arm, from a reference position to a position where the photosensor detects the outside diameter of the new web roll, is detected. Based on this angle of rotation, the diameter of the new web roll is determined.

A splicing standby position setting device for the new web roll in the automatic splicing apparatus of the offset rotary press also has a similar transmission type photosensor provided in a direction intersecting the transport path of the new web roll transported by the turret arm. When the photosensor has detected the outside diameter of the new web roll, the rotation of the turret arm is stopped, and the new web roll is set at a splicing standby position.

With the above-described diameter measuring device and the splicing standby position setting device, however, if the outside diameter of the new web roll is smaller than the external dimension of the turret arm, the transmission type photosensor detects the turret arm earlier than the outside diameter of the new web roll, stopping the rotation of the turret arm. Thus, there are problems that the diameter of the new web roll cannot be determined accurately, and the new web roll cannot be set precisely at the splicing standby position.

SUMMARY OF THE INVENTION

The present invention has been accomplished in light of the above-mentioned problems. It is the object of the invention to provide a strip continuous supply apparatus and method which can not only determine the diameter of a new web roll accurately regardless of the shape of a turret arm, but also set the new web roll at a splicing standby position precisely, by measuring the distance from a position opposed to the circumferential surface of the new web roll to the circumferential surface of the new web roll when the new web roll stops at a diameter measuring position.

According to an aspect of the invention for attaining the above-mentioned object, there is provided a strip continuous supply apparatus, comprising:

a turret arm, supported rotatably, for supporting a new web roll and an old web roll;

a turret arm drive device for rotating the turret arm, and adapted to splice a strip of the new web roll to a strip of the old web roll, thereby continuously supplying a strip;

a distance measuring device, provided at a position opposed to a circumferential surface of the new web roll when the new web roll stops at a diameter measuring position, for measuring a distance to the new web roll; and a control device for determining a diameter of the new web roll in accordance with an output from the distance measuring device, and also driving the turret arm drive device in accordance with the diameter of the new web roll to move the new web roll to a splicing standby position.

The strip continuous supply apparatus may further comprise a turret arm rotation angle detection device for detecting a rotation angle of the turret arm, and the control device may drive the turret arm drive device, and stop the turret arm drive device in accordance with an output from the turret arm rotation angle detection device to move the new web roll to the splicing standby position.

The strip continuous supply apparatus may further comprise a turret arm rotation angle detection device for detecting a rotation angle of the turret arm, and the control device may drive the turret arm drive device, and stop the turret arm drive device in accordance with an output from the turret arm rotation angle detection device to move the new web roll to the diameter measuring position.

The strip continuous supply apparatus may further comprise a new web roll detection device for detecting the new web roll, and if the determined diameter of the new web roll is larger than a certain value, the control device may drive the turret arm drive device, and stop the turret arm drive device in accordance with an output from the new web roll detection device to move the new web roll to the splicing standby position.

In the strip continuous supply apparatus, the distance measuring device may be a distance meter using an ultrasonic wave or light including laser.

In the strip continuous supply apparatus, the new web roll detection device may be a transmission photosensor, provided in a direction intersecting a transport path of the new web roll transported by the turret arm for detecting an outside diameter of the new web roll at the splicing standby position.

According to another aspect of the present invention, there is provided a strip continuous supply method in a strip continuous supply apparatus, comprising:

providing a turret arm, supported rotatably, for supporting a new web roll and an old web roll;

providing a turret arm drive device for rotating the turret arm, and adapted to splice a strip of the new web roll to a strip of the old web roll, thereby continuously supplying a strip;

measuring a distance from a position opposed to a circumferential surface of the new web roll to the circumferential surface of the new web roll when the new web roll stops at a diameter measuring position, thereby determining a diameter of the new web roll; and also driving the turret arm drive device in accordance with the determined diameter of the new web roll to move the new web roll to a splicing standby position.

The strip continuous supply method may further comprise: detecting a rotation angle of the turret arm; and stopping the turret arm drive device in accordance with a detected value of the rotation angle to move the new web roll to the splicing standby position.

The strip continuous supply method may further comprise: detecting a rotation angle of the turret arm; and stopping the turret arm drive device in accordance with a detected value of the rotation angle to move the new web roll to the diameter measuring position.

The strip continuous supply method may further comprise: detecting the new web roll if the diameter of the new web roll is larger than a certain value; and stopping the turret arm drive device in accordance with the detection of the new web roll to move the new web roll to the splicing standby position.

According to the present invention with the above-described features, when the new web roll stops at the diameter measuring position, the distance from the position opposed to the circumferential surface of the new web roll to the circumferential surface of the new web roll is measured. Based on the measured value, the diameter of the new web roll can be determined, and the turret arm drive device is controlled, whereby the new web roll can be set at the splicing standby position. Thus, it becomes possible to splice a web roll having a diameter smaller than the external dimension of the turret arm, so that high precision splicing control can be exercised.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A strip continuous supply apparatus and method according to the present invention will now be described in detail by an embodiment with reference to the accompanying drawings, but the invention is in no way limited by the embodiment.

Embodiment

Figure 1:
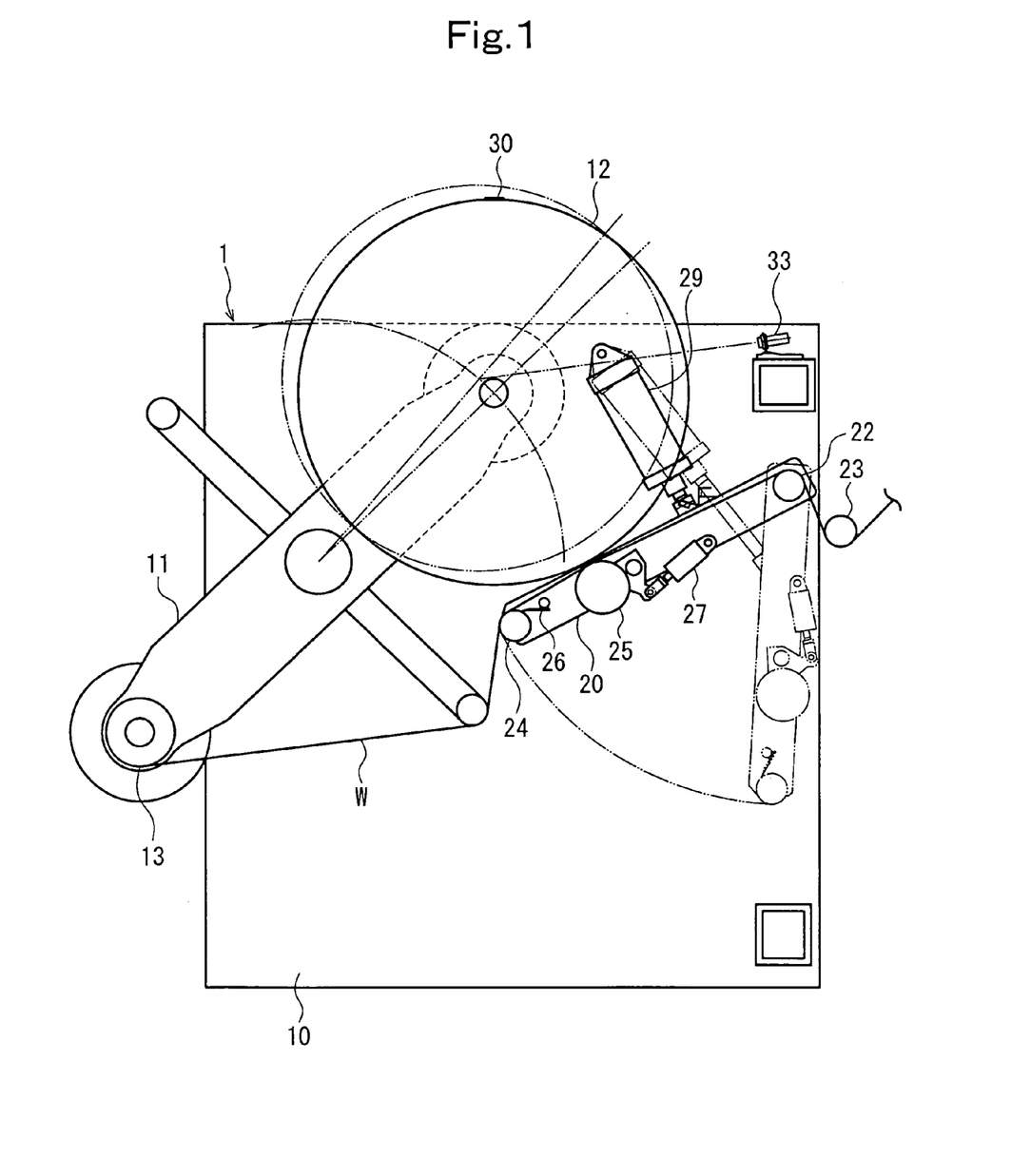
FIG. 1 is a schematic configurational drawing of a feeding apparatus (strip continuous supply apparatus) showing an embodiment of the present invention.
Figure 2:
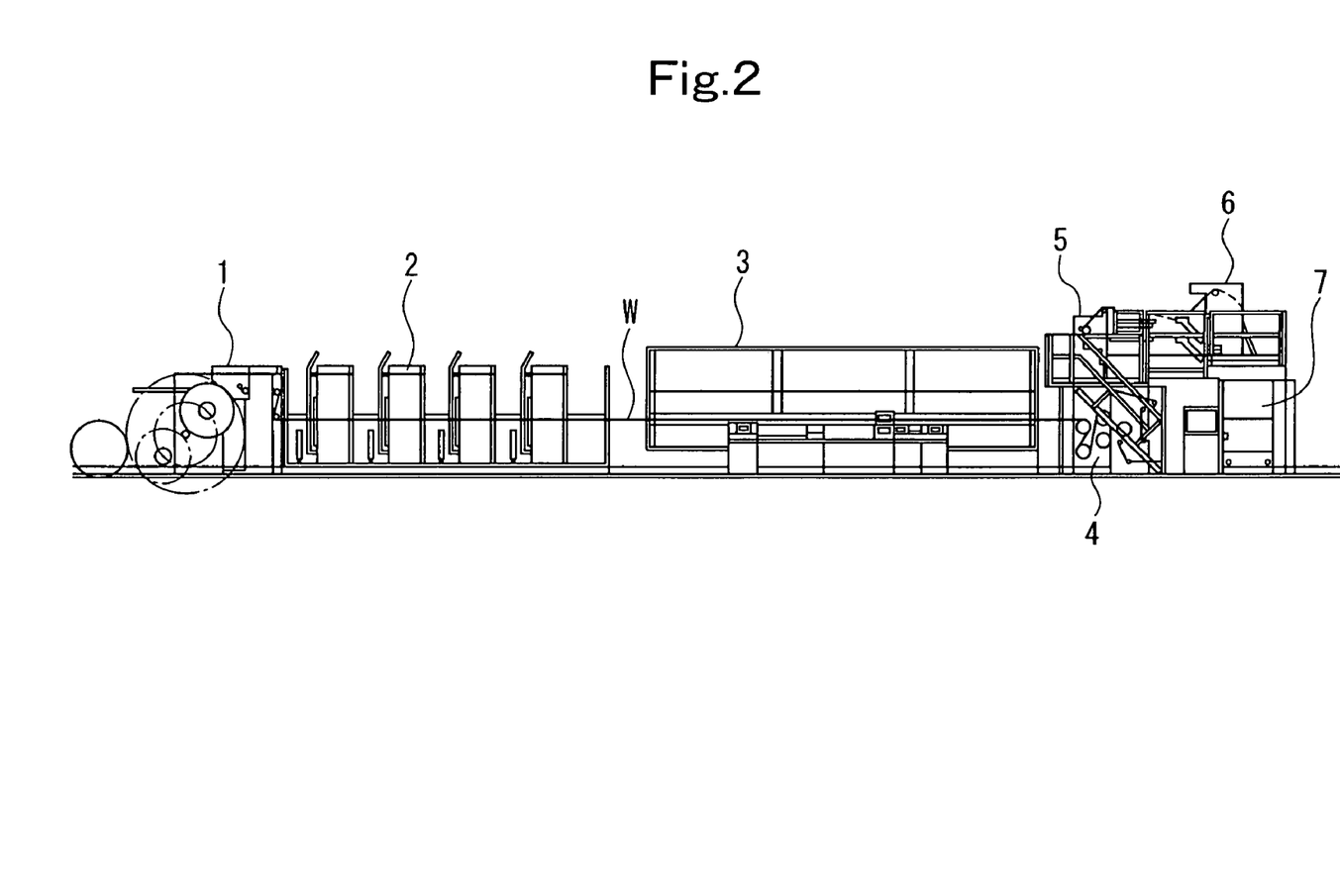
FIG. 2 is an external view of an offset rotary press.
Figure 3:
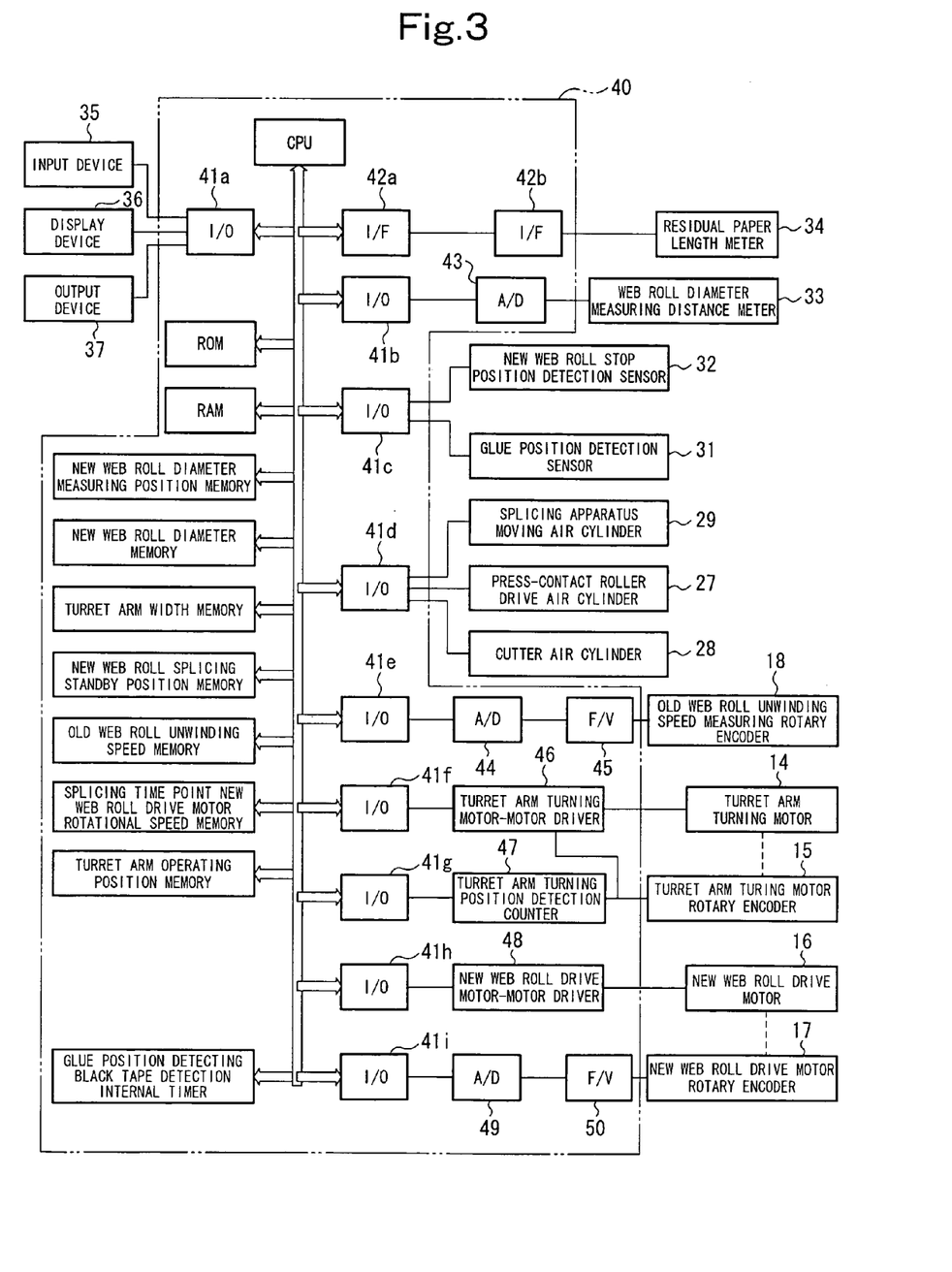
FIG. 3 is a control block diagram.
Figure 4:
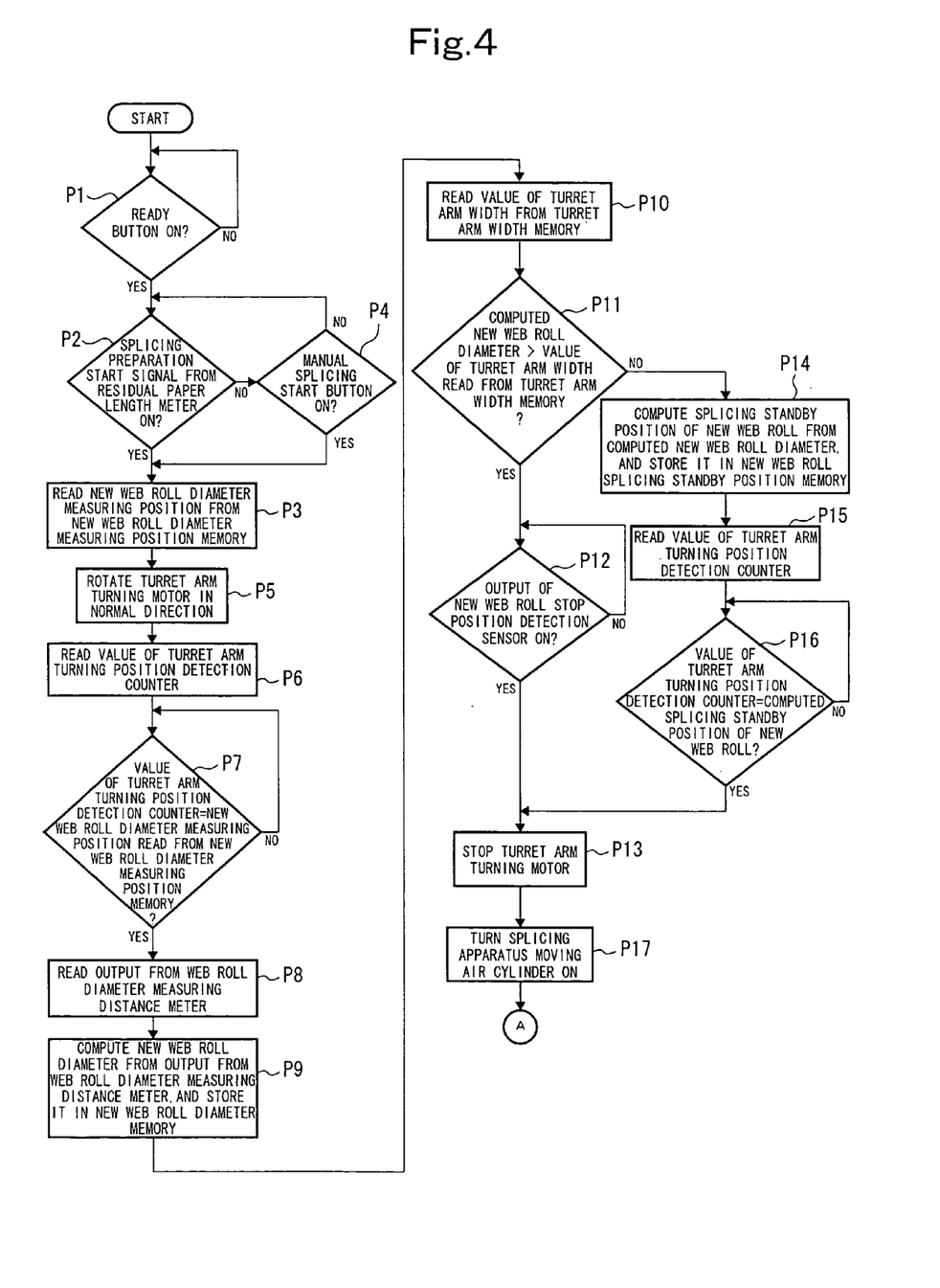
FIG. 4 is a flow chart for splicing control.
Figure 5:
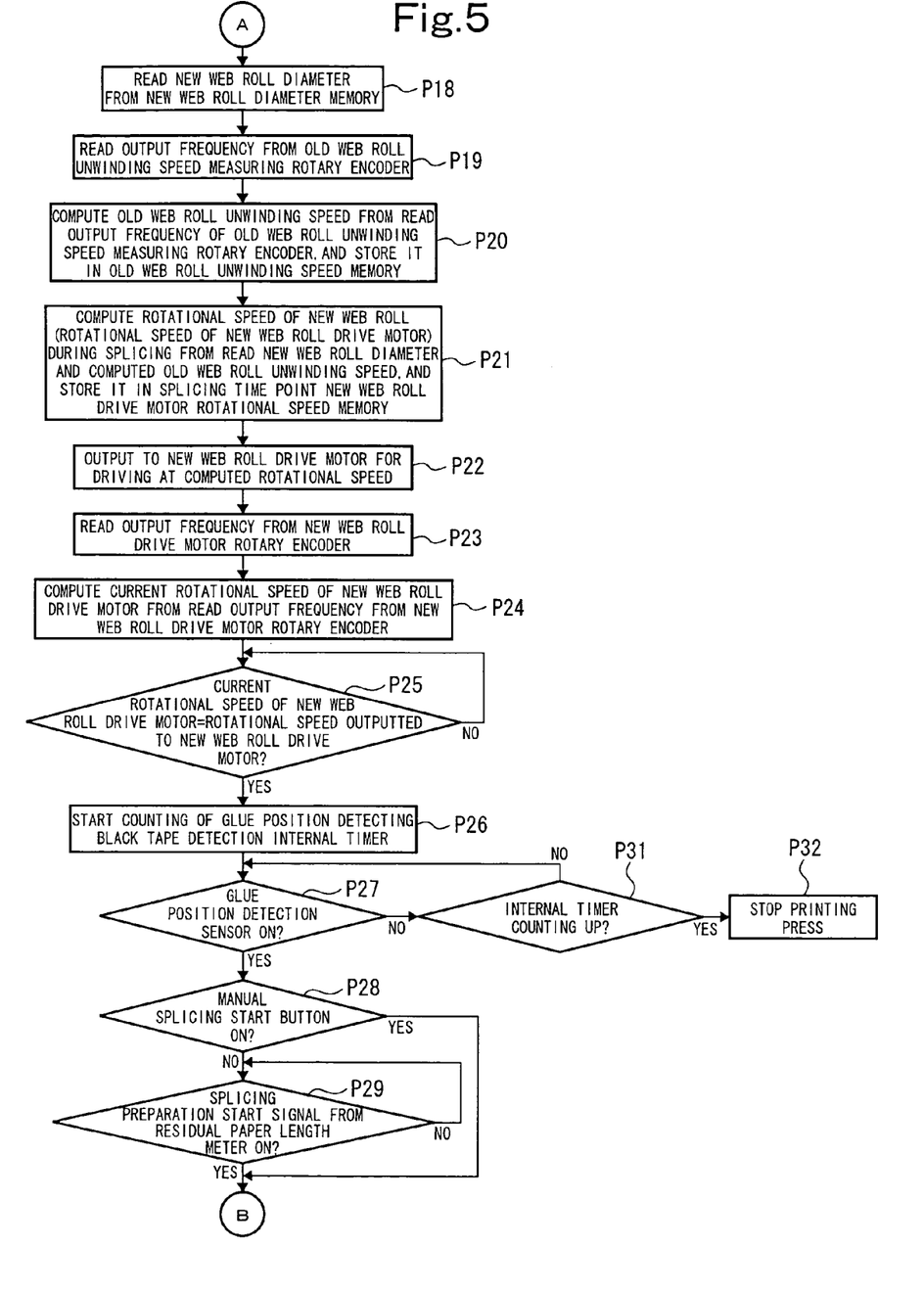
FIG. 5 is a flow chart for splicing control.
Figure 6:
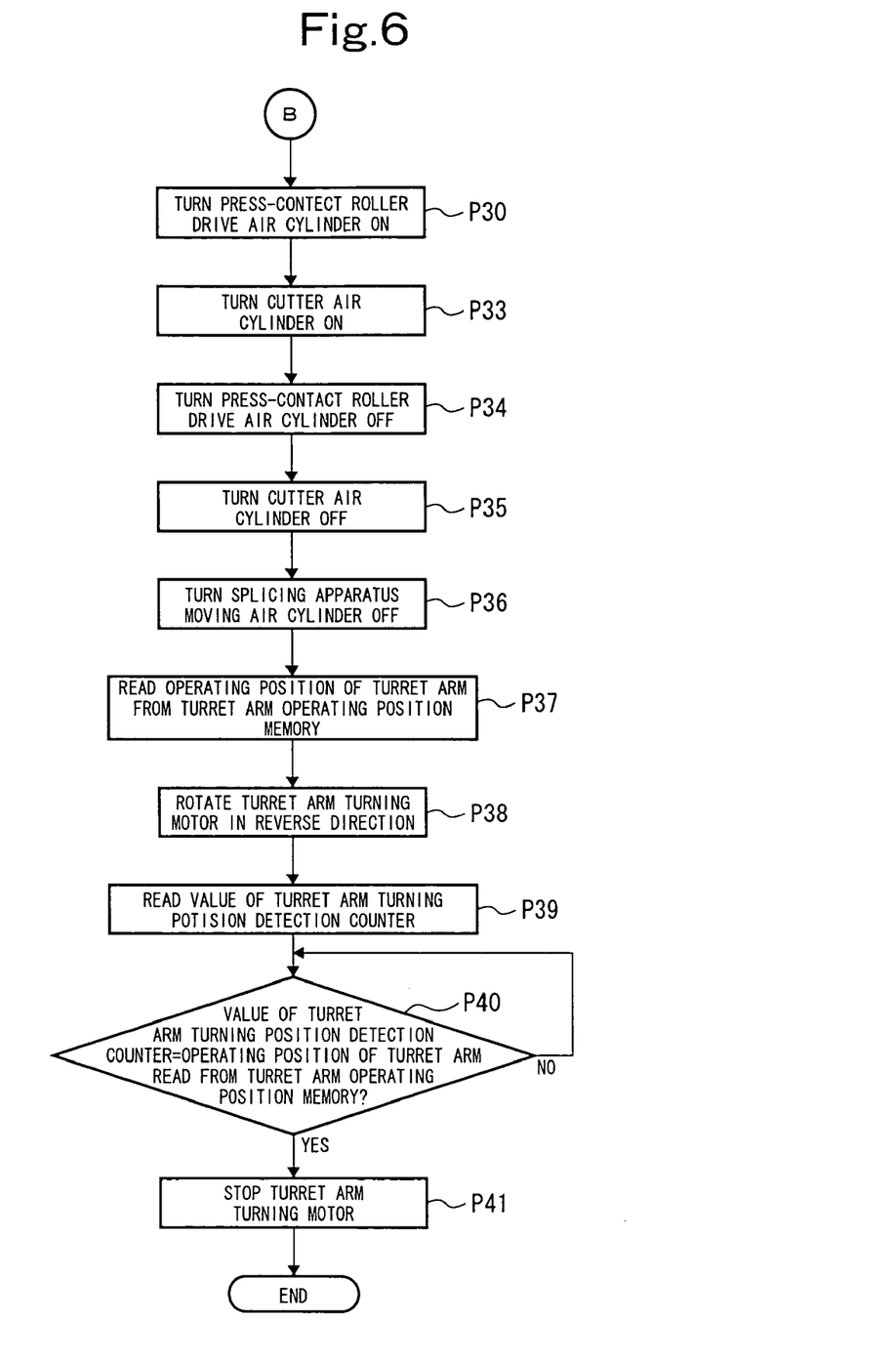
FIG. 6 is a flow chart for splicing control.

FIG. 1 is a schematic configurational drawing of a feeding apparatus (strip continuous supply apparatus) showing an embodiment of the present invention. FIG. 2 is an external view of an offset rotary press. FIG. 3 is a control block diagram. FIGS. 4 to 6 are flowcharts for splicing control.

In an offset rotary press, as shown in FIG. 2, a web (strip) W, continuously supplied from a feeding apparatus (strip continuous supply apparatus) 1, undergoes various printings while passing through printing units 2. Then, the web W is heated and dried when passed through a dryer 3. Then, the web W is cooled when passed through a cooling device 4. Then, when passing through a web path device 5 and a drag device 6, the web W is subjected to tension control or a change in direction. Then, the web W is cut to a predetermined shape and folded by a folder 7.

In the feeding apparatus 1, as shown in FIG. 1, a turret arm 11 has a central portion journaled by an apparatus body 10. A new web roll 12 and an old web roll 13 are mounted on both ends of the turret arm 11. When the web W is unwound from the old web roll 13 and approaches its end of unwinding, a web W from the new web roll 12 is uninterruptedly spliced to the web W of the old web roll 13, and the spliced web is sent to the printing units 2. Thus, the feeding apparatus 1 serves as a so-called automatic splicing apparatus. The state shown in FIG. 1 is a state where the old web roll 13 being unwound approaches the end of its unwinding, and the turret arm 11 is turned to move a next web roll, i.e., new web roll 12, to a splicing standby position (the position indicated by the solid line in FIG. 1).

The turret arm 11, as shown in FIG. 3, is turned by a turret arm turning motor (turret arm drive device) 14, and its turning angle is detected by a turret arm turning motor rotary encoder 15. A predrive device for drivingly rotating the new and old web rolls 12 and 13 is incorporated in the turret arm 11. The surface speed of the new web roll 12, which has been moved to the splicing standby position, is accelerated beforehand by the predrive device until it becomes equal to the travel speed of the web W. In FIG. 3, a new web roll drive motor 16 is provided as the predrive device for driving the new web roll 12, and the rotational speed of the new web roll drive motor 16 is detected by a new web roll drive motor rotary encoder 17. The unwinding speed of the old web roll 13 is detected by an old web roll unwinding speed measuring rotary encoder 18.

The apparatus body 10 is provided with a splicing apparatus 20 such that the splicing apparatus 20 can be pivoted by a splicing apparatus moving air cylinder 29. The splicing apparatus 20 is pivotable, with respect to the new web roll 12 moved to the splicing standby position, from a release position indicated by double-dotted chain lines in FIG. 1 to a contact position indicated by solid lines in FIG. 1. In the state where the splicing apparatus 20 has moved to the contact position, the web W unwound from the old web roll 13 passes through a clearance between the new web roll 12 and the splicing apparatus 20, and is paid out toward the printing units 2 past a plurality of rolls 22 and 23.

The splicing apparatus 20 is provided with a fixed roll 24 for guiding the web W, and is also provided with a press-contact roller 25 and a cutter 26 such that the press-contact roller 25 and the cutter 26 can advance and retreat. As shown in FIG. 3, the press-contact roller 25 is driven by a press-contact roller drive air cylinder 27, and the cutter 26 is driven by a cutter air cylinder 28. The splicing apparatus 20 is mounted with a glue position detection sensor 31 for detecting a double-coated adhesive tape 30 (see FIG. 1) located at the front end of the web of the new web roll 12.

As shown in FIG. 3, the apparatus body 10 is also mounted with a new web roll stop position detection sensor (new web roll detection device) 32, and a web roll diameter measuring distance meter (distance measuring device) 33. The new web roll stop position detection sensor 32 is provided, in a direction intersecting the transport path of the new web roll 12 transported by the turret arm 11, to detect the outside diameter of the new web roll 12 at the splicing standby position. A transmission type photosensor or the like is adopted as the new web roll stop position detection sensor 32. The web roll diameter measuring distance meter 33 is provided at a position, where the distance meter 33 is opposed to the circumferential surface of the new web roll 12 when the new web roll 12 stops at the diameter measuring position (the position indicated by the double dotted chain line in FIG. 1), to measure the distance to the circumferential surface of the new web roll 12 by use of an ultrasonic wave or light (laser).

The turret arm turning motor 14, the new web roll drive motor 16, the press-contact roller drive air cylinder 27, the cutter air cylinder 28, and the splicing apparatus moving air cylinder 29 are drivingly controlled by a control device 40.

The control device 40 comprises CPU, ROM, and RAM, and also includes a new web roll diameter measuring position memory, a new web roll diameter memory, a turret arm width memory, a new web roll splicing standby position memory, an old web roll unwinding speed memory, a splicing time point new web roll drive motor rotational speed memory, a turret arm operating position memory, and a glue position detecting black tape detection internal timer. These devices, these memories, input/output devices 41a to 41i, and interfaces 42a, 42b are connected together by a bus-line BUS.

An input device 35, such as a ready button, a manual splicing start button, or a key board, a display device 36, such as CRT or a display, and an output device 37, such as a printer or a floppy disk (registered trademark) drive, are connected to the input/output device 41a. The web roll diameter measuring distance meter 33 is connected to the input/output device 41b via an A/D converter 43.

The glue position detection sensor 31 and the new web roll stop position detection sensor 32 are connected to the input/output device 41c. The (electromagnetic valve of) press-contact roller drive air cylinder 27, the (electromagnetic valve of) cutter air cylinder 28, and the (electromagnetic valve of) splicing apparatus moving air cylinder 29 are connected to the input/output device 41d.

The old web roll unwinding speed measuring rotary encoder 18 is connected to the input/output device 41e via an A/D converter 44 and an F/V converter 45. The turret arm turning motor 14 is connected to the input/output device 41f via a turret arm turning motor-motor driver 46.

The turret arm turning motor rotary encoder 15 is connected to the input/output device 41g via a turret arm turning position detection counter 47. A detection signal (clock pulse) of the turret arm turning motor rotary encoder 15 is inputted into the turret arm turning motor-motor driver 46.

The new web roll drive motor 16 is connected to the input/output device 41h via a new web roll drive motor-motor driver 48. The new web roll drive motor rotary encoder 17 is connected to the input/output device 41i via an A/D converter 49 and an F/V converter 50.

A residual paper length meter 34 is connected to the interfaces 42a, 42b. The residual paper length meter 34 is a computing device which always monitors the residual paper length of the old web roll 13, calculates how many minutes are left until splicing becomes necessary if the web is unwound at the current web travel speed, and outputs a splicing preparation start signal when the remaining time is less than the make-ready time. Its concrete features were already rendered publicly known by Japanese Utility Model Registration No. 2568743. Thus, its detailed explanation is omitted herein.

According to the control device 40, because of the above-described features, the turret arm 11 is turned by the turret arm turning motor 14 and stopped thereby at the diameter measuring position of the new web roll 12. In this state, the distance (L1) to the circumferential surface of the new web roll 12 is measured by the web roll diameter measuring distance meter 33. Based on the measured value, the diameter (d1) of the new web roll 12 is determined. That is, since the distance (L2) between the web roll diameter measuring distance meter 33 and the center of the new web roll 12 is known, the diameter (d1) of the new web roll 12 can be obtained by performing the computation d1=2(L2−L1) using the converters.

Moreover, the angle of rotation of the turret arm 11 from its reference position made until the turret arm 11 sets the new web roll 12 at the splicing stand by position is found from the diameter (d1) of the new web roll 12 measured above. The turret arum 11 is rotated through this rotation angle by the turret arm turning motor 14 to set the new web roll 12 at the splicing standby position.

Such a series of actions for splicing control will be described in detail in accordance with flow charts of FIGS. 4 to 6.

In Step P1, it is determined whether the ready button for entering into splicing control is ON. If the ready button is ON, it is determined in Step P2 whether the splicing preparation start signal from the residual paper length meter 34 is ON. If the splicing preparation start signal is ON, the new web roll diameter measuring position is read from the new web roll diameter measuring position memory in Step P3. Even if the splicing preparation start signal is not ON in Step P2, the program proceeds to Step P3, if the manual splicing start button is ON in Step P4.

Then, in Step P5, the turret arm turning motor 14 is driven for normal rotation, and in Step P6, the value of the turret arm turning position detection counter 47 is read. Then, in Step P7, it is determined whether the value of the turret arm turning position detection counter 47 is consistent with the new web roll diameter measuring position read from the new web roll diameter measuring position memory.

If consistency is found in Step P7, an output from the web roll diameter measuring distance meter 33 is read in Step P8. Also, in Step P9, the diameter of the new web roll is computed from the output of the web roll diameter measuring distance meter 33, and is stored in the new web roll diameter memory.

Then, in Step P10, the value of the width of the turret arm 11 is read from the turret arm width memory. Then, in Step P11, it is determined whether the computed diameter of the new web roll is greater than the value of the width of the turret arm 11 read from the turret arm width memory. If the answer is YES, the program proceeds to Step P12, determining whether the new web roll stop position detection sensor 32 is ON. If ON, the turret arm turning motor 14 is stopped in Step P13.

If the computed diameter of the new web roll is found in Step P11 to be smaller than the value of the width of the turret arm 11, the splicing standby position of the new web roll 12 is computed from the computed diameter of the new web roll in Step P14, where the computed result is stored in the new web roll splicing standby position memory. Then, in Step P15, the value of the turret arm turning position detection counter 47 is read. Then, in Step P16, it is determined whether the value of the turret arm turning position detection counter 47 is consistent with the computed splicing standby position of the new web roll 12. If consistency is found, the program shifts to Step P13.

Then, in Step P17, the splicing apparatus moving air cylinder 29 is turned on, where after in Step P18, the diameter of the new web roll is read from the new web roll diameter memory. Then, in Step P19, an output frequency from the old web roll unwinding speed measuring rotary encoder 18 is read.

Then, in Step P20, the unwinding speed of the old web roll 13 is computed from the read output frequency of the old web roll unwinding speed measuring rotary encoder 18, and is stored in the old web roll unwinding speed memory. Then, in Step P21, the rotational speed of the new web roll 12 (the rotational speed of the new web roll drive motor 16) at the time of splicing is computed from the read diameter of the new web roll and the computed unwinding speed of the old web roll 13, and is stored in the splicing time point new web roll drive motor rotational speed memory.

Then, in Step P22, an output is issued to the new web roll drive motor 16 so that the new web roll drive motor 16 is driven at the computed rotational speed. Then, in Step P23, an output frequency from the new web roll drive motor rotary encoder 17 is read. Then, in Step P24, the current rotational speed of the new web roll drive motor 16 is computed from the read output frequency from the new web roll drive motor rotary encoder 17.

Then, in Step P25, it is determined whether the current rotational speed of the new web roll drive motor 16 is consistent with the rotational speed outputted to the new web roll drive motor 16. If the answer is affirmative, counting of the glue position detecting black tape detection internal counter is started in Step P26.

Then, determinations are made in Step P27 as to whether the glue position detection sensor 31 is ON, in Step P28 as to whether the manual splicing start button is ON, and in Step P29 as to whether the splicing preparation start signal from the residual paper length meter 34 is ON. If ON in these steps, the press-contact roller drive air cylinder 27 is turned on in Step P30. If the glue position detection sensor 31 is not ON in Step P27, and if the glue position detecting black tape detection internal timer is found to count up in Step P31, the control device 40 makes a determination "Abnormal", thus stopping the operation of the printing press in Step P32.

Then, in Step P33, the cutter air cylinder 28 is turned on to cut the web W of the old web roll 13. In this situation, the press-contact roller drive air cylinder 27, the cutter air cylinder 28, and the splicing apparatus moving air cylinder 29 are turned off in Steps P34 to P36, completing the splicing actions.

Then, in Step P37, the operating position of the turret arm 11 is read from the turret arm operating position memory. Then, in Step P38, the turret arm turning motor 14 is driven for reverse rotation.

Finally, in Step P39, the value of the turret arm turning position detection counter 47 is read. In Step P40, it is determined whether the read value of the turret arm turning position detection counter 47 is consistent with the operating position of the turret arm 11 read from the turret arm operating position memory. If consistency is found, the turret arm turning motor 14 is stopped in Step P41 to terminate splicing control.

In the present embodiment, as described above, the feeding apparatus is equipped with the following web roll diameter measuring distance meter 33, and the following control device 40:

the web roll diameter measuring distance meter 33, which is provided at a position, where the distance meter 33 is opposed to the circumferential surface of the new web roll 12 when the new web roll 12 stops at a diameter measuring position, and which measures the distance to the new web roll 12; and the control device 40 which finds the diameter of the new web roll 12 in accordance with the output from the web roll diameter measuring distance meter 33, and also drives the turret arm turning motor 14 in accordance with the found diameter of the new web roll 12 to move the new web roll 12 to the splicing standby position.

Hence, the diameter of the new web roll 12 can be determined accurately without influence from the external dimension of the turret arm. Moreover, based on this value, the turret arm turning motor 14 is controlled, whereby the new web roll 12 can be set at the splicing standby position accurately. Consequently, high precision splicing control can be performed.

The feeding apparatus is also provided with the turret arm turning motor rotary encoder 15 for detecting the rotation angle of the turret arm 11. The control device 40 drives the turret arm turning motor 14, and stops the turret arm turning motor 14 in accordance with the output from the turret arm turning motor rotary encoder 15 to move the new web roll 12 to the splicing standby position. Hence, the new web roll 12 can be set at the splicing standby position more precisely.

The feeding apparatus is also provided with the turret arm turning motor rotary encoder 15 for detecting the rotation angle of the turret arm 11. The control device 40 drives the turret arm turning motor 14, and stops the turret arm turning motor 14 in accordance with the output from the turret arm turning motor rotary encoder 15 to move the new web roll 12 to the diameter measuring position. Hence, the new web roll 12 can be moved to the diameter measuring position more precisely.

The feeding apparatus is also provided with the new web roll stop position detection sensor 32. If the measured diameter of the new web roll 12 is larger than a certain value, the control device 40 drives the turret arm turning motor 14, and stops the turret arm turning motor 14 in accordance with the output from the new web roll stop position detection sensor 32 to move the new web roll 12 to the splicing standby position. Hence, if the diameter of the new web roll 12 is greater than the width of the turret arm 11, the new web roll 12 can be precisely moved to the splicing standby position by simple control, without any trouble (without the conventional erroneous detection of the outside diameter of the turret arm 11 as the outside diameter of the new web roll 12).

While the present invention has been described by the foregoing embodiment, it is to be understood that the invention is not limited thereby, but may be varied in many other ways. For example, the strip continuous supply apparatus and method according to the present invention can be applied not only to an offset rotary press, but also as a web material supply device in a machine, such as a corrugator or a laminator. Such variations are not to be regarded as a departure from the spirit and scope of the invention, and all such modifications as would be obvious to one skilled in the art are intended to be included within the scope of the appended claims.

What is claimed is:

1. A strip continuous supply apparatus, comprising:
   a turret arm, supported rotatably, for supporting a new web roll and an old web roll;
   a turret arm drive device for rotating said turret arm, and adapted to splice a strip of said new web roll to a strip of said old web roll, thereby continuously supplying a strip;
   a distance measuring device, provided at a position opposing a circumferential surface of said new web roll when said new web roll stops at a diameter measuring position, for measuring a distance to said new web roll; and a control device for determining a diameter of said new web roll in accordance with an output from said distance measuring device, and also driving said turret arm drive device in accordance with said determined diameter of said new web roll, determined on the basis of an output of the distance measuring device, to move said new web roll to a splicing standby position.

2. The strip continuous supply apparatus according to claim 1, further comprising:

a turret arm rotation angle detection device for detecting a rotation angle of said turret arm, wherein said control device drives said turret arm drive device, and stops said turret arm drive device in accordance with an output from said turret arm rotation angle detection device to move said new web roll to said splicing standby position.

3. The strip continuous supply apparatus according to claim 1, further comprising:

a turret arm rotation angle detection device for detecting a rotation angle of said turret arm, wherein said control device drives said turret arm drive device, and stops said turret arm drive device in accordance with an output from said turret arm rotation angle detection device to move said new web roll to said diameter measuring position.

4. The strip continuous supply apparatus according to claim 1, further comprising:

a new web roll detection device for detecting said new web roll, wherein if said determined diameter of said new web roll is larger than a certain value, said control device drives said turret arm drive device, and stops said turret arm drive device in accordance with an output from said new web roll detection device to move said new web roll to said splicing standby position.

5. The strip continuous supply apparatus according to claim 4, wherein said new web roll detection device is a transmission photosensor, provided in a direction intersecting a transport path of said new web roll transported by said turret arm, for detecting an outside diameter of said new web roll at said splicing standby position.

6. The strip continuous supply apparatus according to claim 1, wherein said distance measuring device is a distance meter using an ultrasonic wave or light.

7. The strip continuous supply apparatus according to claim 6, wherein said light includes laser.

8. A strip continuous supply method in a strip continuous supply apparatus, comprising:

providing a turret arm, supported rotatably, for supporting a new web roll and an old web roll;

providing a turret arm drive device for rotating said turret arm, and adapted to splice a strip of said new web roll to a strip of said old web roll, thereby continuously supplying a strip;

measuring a distance from a position opposing a circumferential surface of said new web roll to said circumferential surface of said new web roll when said new web roll stops at a diameter measuring position, thereby determining a diameter of said new web roll; and driving said turret arm drive device in accordance with the determined diameter of said new web roll, determined on the basis of the measured distance to the circumferential surface of the new web roll, to move said new web roll to a splicing standby position.

9. The strip continuous supply method according to claim 8, further comprising:

detecting a rotation angle of said turret arm; and stopping said turret arm drive device in accordance with a detected value of said rotation angle to move said new web roll to said splicing standby position.

10. The strip continuous supply method according to claim 8, further comprising:

detecting a rotation angle of said turret arm; and stopping said turret arm drive device in accordance with a detected value of said rotation angle to move said new web roll to said diameter measuring position.

11. The strip continuous supply method according to claim 8, further comprising:

detecting said new web roll if said diameter of said new web roll is larger than a certain value; and stopping said turret arm drive device in accordance with the detection of said new web roll to move said new web roll to said splicing standby position.

* * * * *